(12) United States Patent
Hengen

(10) Patent No.: US 10,260,986 B2
(45) Date of Patent: Apr. 16, 2019

(54) PIPELINE ELEMENT LEAK DETECTION SYSTEM AND METHOD

(71) Applicant: Derek J Hengen, Arcola (CA)

(72) Inventor: Derek J Hengen, Arcola (CA)

( * ) Notice: Subject to any disclaimer, the term of this patent is extended or adjusted under 35 U.S.C. 154(b) by 486 days.

(21) Appl. No.: 14/820,247

(22) Filed: Aug. 6, 2015

(65) Prior Publication Data
US 2016/0349142 A1    Dec. 1, 2016

(30) Foreign Application Priority Data

Aug. 8, 2014   (CA) ..................................... 2858810

(51) Int. Cl.
*G01M 3/28*     (2006.01)
*F16L 9/12*     (2006.01)
(Continued)

(52) U.S. Cl.
CPC ............. *G01M 3/2853* (2013.01); *B32B 1/08* (2013.01); *F16L 9/12* (2013.01); *F16L 9/22* (2013.01); *G01M 3/18* (2013.01); *G01M 3/183* (2013.01); *G01M 3/22* (2013.01); *G01M 3/223* (2013.01); *G01M 3/28* (2013.01); *G01M 3/2815* (2013.01); *F16L 55/178* (2013.01); *F16L 55/179* (2013.01); *F16L 2201/30* (2013.01)

(58) Field of Classification Search
CPC ........ G01M 3/18; G01M 3/182; G01M 3/183; G01M 3/184; G01M 3/22; G01M 3/222; G01M 3/223; G01M 3/224; G01M 3/24; G01M 3/243; G01M 3/28; G01M 3/2807; G01M 3/2815; G01M 3/283; G01M 3/2853; G01M 3/2861; G01M 3/2876; F16L 9/12; F16L 9/22; F16L 11/00; F16L 11/04; F16L 11/14; B32B 1/08
See application file for complete search history.

(56) References Cited

U.S. PATENT DOCUMENTS 3,996,789 A   12/1976  Wilson
5,397,615 A   3/1995   Van Beersel
(Continued)

FOREIGN PATENT DOCUMENTS

CA   2346692 A1   2/2001
GB   55521/71     11/1971
(Continued)

*Primary Examiner* — Walter Aughenbaugh
(74) *Attorney, Agent, or Firm* — Michael A. Bondi; Moss & Barnett

(57) ABSTRACT

A system for detecting leaks comprises at least one pipeline element, a leak detection device, and a pre-formed, heat-shrinkable sleeve comprising at least one inlet aperture. A method of manufacturing the sleeve comprises the steps of applying a cross-linkable material around a standard-sized sleeve mold, cross-linking the material, removing the cross-linked material from the mold, heating and stretching the cross-linked material around a stretching sleeve mold, allowing the material to cool, and removing the cooled sleeve from the mold. A method of monitoring a leak comprises the steps of receiving the pipeline element in the sleeve and applying heat to the sleeve, whereby the sleeve shrinks and conforms substantially around the profile of the pipeline element and at least a portion of the leak detection device.

10 Claims, 7 Drawing Sheets

(51) Int. Cl.
    *B32B 1/08*     (2006.01)
    *G01M 3/22*     (2006.01)
    *F16L 9/22*     (2006.01)
    *G01M 3/18*     (2006.01)
    *F16L 55/179*     (2006.01)
    *F16L 55/178*     (2006.01)

(56) References Cited

U.S. PATENT DOCUMENTS

| | | | |
|---|---|---|---|
| 5,921,284 A | 7/1999 | Hauff | |
| 6,550,499 B1 * | 4/2003 | Pai | F16L 11/12 |
| | | | 138/104 |
| 6,843,515 B2 | 1/2005 | Kornrumpf | |

FOREIGN PATENT DOCUMENTS

| | | |
|---|---|---|
| JP | 59154334 A | 9/1984 |
| JP | 05141590 A | 6/1993 |
| JP | 2002082010 A | 3/2002 |
| JP | 2003028351 A | 1/2003 |
| JP | 2004311634 A | 11/2004 |
| JP | 4275520 B2 | 6/2009 |
| JP | 2013076448 A | 4/2013 |
| WO | 2009088300 A1 | 7/2009 |

* cited by examiner

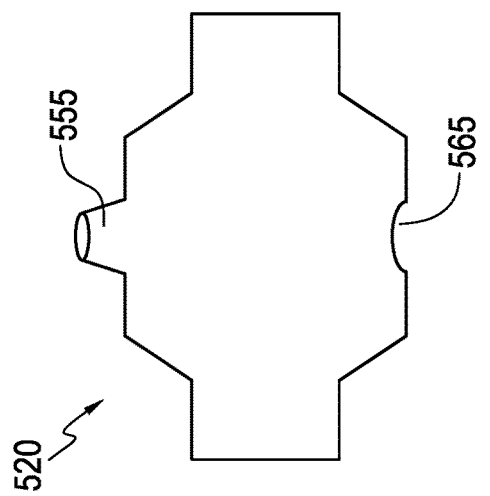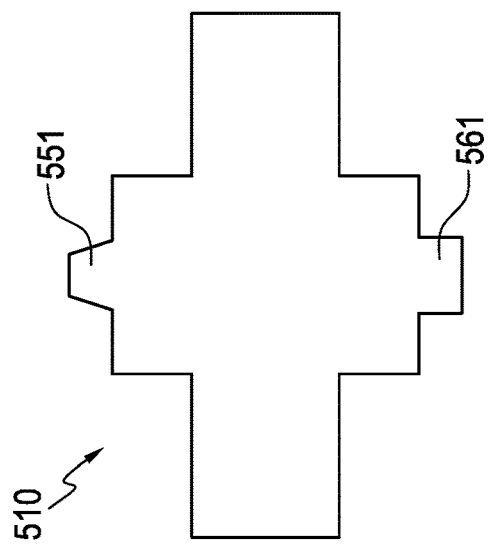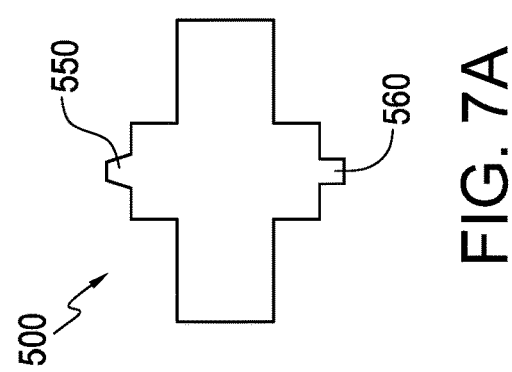

PIPELINE ELEMENT LEAK DETECTION SYSTEM AND METHOD

FIELD OF THE INVENTION

This invention is in the field of pipeline leak detection, and more specifically to systems and devices used in the detection and containment of leaks in pipeline joints and bends.

BACKGROUND

Fluids frequently need to be transported from one location to another, for example, from a reserve tank to a treatment tank, and a convenient method of transporting such fluids is through pipelines. However, pipelines can be vulnerable to leakage, which is a problem for many reasons.

Fluid leakage from a pipeline can result in loss of product being transported, negatively impacting product realization. If the leak goes undetected, the loss of product can be very expensive over time. Leakage in pipes can also cause a reduction in pipeline pressure, meaning less flow of the fluid within the pipes, and therefore reducing system efficiency. Leaks need to be detected and contained as soon as possible, especially if the fluid being transported through the pipes is hazardous to the environment or is caustic or otherwise dangerous, posing a safety risk to personnel near the location of the leak or who might be operating beneath the pipes. When potentially hazardous substances leak from pipelines into the space below, there is the risk of the leaking substance causing fires or damage to items below the leak, or even potentially injuring people walking below.

It is therefore important to be able to detect leakages in pipelines quickly and to be able to contain such leakages before they cause damage to the environment or to property, or to harm people in the leakage's vicinity.

Leakage in pipelines can be particularly common at bends in pipes and at pipe joints. Bends in pipes, or the knurl portion of a pipe, may oftentimes be weaker than other portions of the pipeline, and may therefore be more prone to cracks or ruptures than other portions. The connection junction between two or more pipes may also be vulnerable to leakage if the connection coupling between the pipes breaks down or if there are cracks at the junction. It may therefore be prudent to pay particular attention to these areas of bends and joints in targeting areas to apply leakage preventative measures.

Some attempts at monitoring leaky pipe joints include the use of pressure monitors within the pipeline to determine if there is a drop in fluid pressure. However, such methods of monitoring leaky pipe joints do not do anything to contain the leakage. Methods of containing leaky pipe joints include the use of gaskets in between pipe joints that will aid in preventing seepage of leak when there is a leak at the joint. The pressure within the gasket can be monitored to detect if there is a leak. However, gaskets are prone to overflowing or failing to seal a leak if the leak is large enough, the pressure at the pipe joint is too great, or the mating surfaces of the pipe joint are too irregular to allow the gasket to create a proper seal, which may still allow for harmful fluids within the pipes to escape.

SUMMARY OF THE INVENTION

In an aspect, a pre-formed, heat-shrinkable sleeve comprises a heat-shrinkable base adapted to conform substantially around the profile of at least one pipeline element when heat is applied, the at least one pipeline element selected from the group consisting of a pipe joint, a pipe bend, and a portion of a pipe adjacent to a pipe end, at least one sensing aperture, and at least one inlet aperture.

In a further aspect, a system for detecting leaks in pipeline elements comprises at least one pipeline element selected from the group consisting of a pipe joint, a pipe bend, and a portion of a pipe adjacent a pipe end, a leak detection device, an inlet port, and a pre-formed, heat-shrinkable sleeve conforming substantially around the profile of the at least one pipeline element, at least a portion of the leak detection device, and at least a portion of the inlet port.

In yet a further aspect, a method of manufacturing a pre-formed shrinkable sleeve comprises the steps of applying a cross-linkable material around a standard-sized sleeve mold, cross-linking the material, removing the cross-linked material from the standard-sized sleeve mold, heating and stretching the cross-linked material around a stretching sleeve mold, allowing the cross-linked and stretched material to cool, and removing the cooled sleeve from the stretching sleeve mold.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

FIG. 7A is side elevational view of a standard-sized sleeve mold in an aspect;

FIG. 7B is a side elevational view of a stretching sleeve mold in an aspect; and FIG. 7C is a side elevational view of a heat-shrinkable sleeve in an aspect, formed using the sleeve molds shown in FIGS. 7A and 7B.

DETAILED DESCRIPTION OF THE ILLUSTRATED EMBODIMENTS

A pre-formed heat-shrinkable sleeve is provided. The pre-formed heat-shrinkable sleeve can be fitted over a pipeline joint, bend, end, or other pipeline element, and heated so that it shrinks tightly into place around the joint, bend, or end, substantially sealing the pipeline joint, bend, or end. Since the sleeve is pre-formed for specific joint, bend, and end types and sizes, the sleeve can conform substantially to the profile of the joint, bend, end, or other pipeline element to which it is applied, potentially forming a tighter seal around the pipeline element to contain a leak than might otherwise be the case. To substantially conform to the profile of the pipeline element, the sleeve can be sized so as to be able to receive the pipeline element of specific dimensions therein, and so as to shrink to a size that is only slightly larger than the pipeline element but with generally the same shape and proportions as the pipeline element when heat is applied. In this way, when the sleeve is in its shrunken state, at least a portion of the inner surface of the sleeve can be in contact with the pipeline element to which it is applied.

Figure 1:
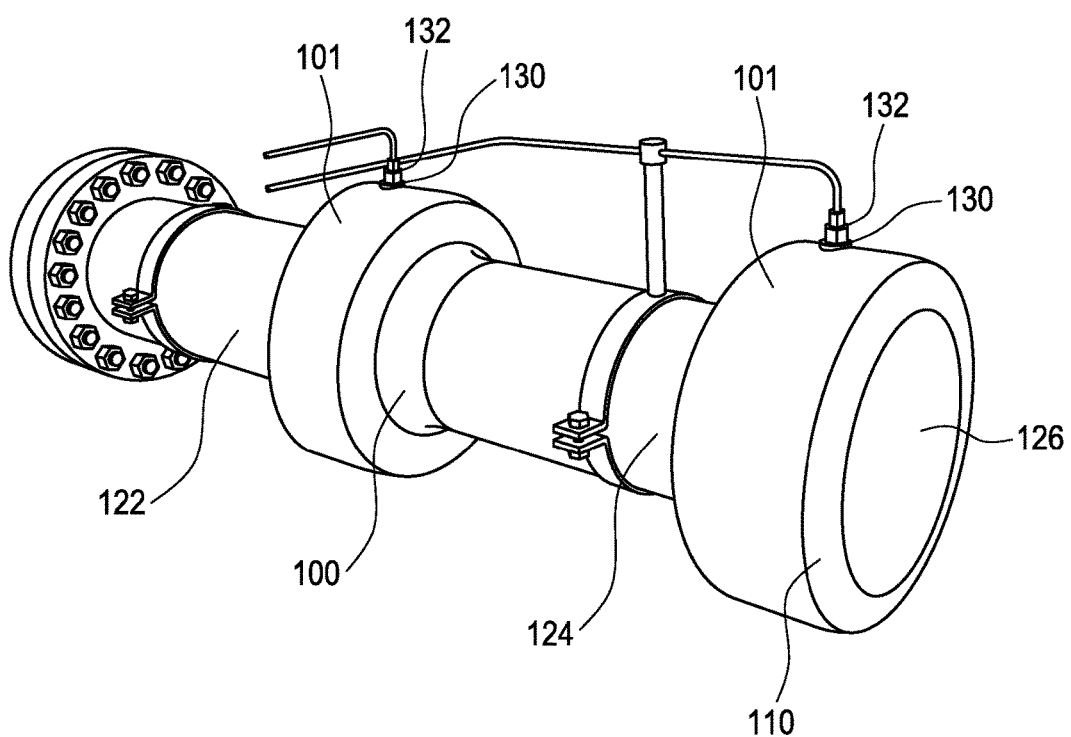
FIG. 1 is a perspective view of a heat-shrinkable sleeve in an aspect installed on a pipeline joint.

FIG. 1 illustrates two heat-shrinkable sleeves 100, 110 in an aspect. One of the heat shrinkable sleeves 100 is installed on a pipeline joint at the junction between two pipes 122, 124, while the other heat shrinkable sleeve 110 is installed adjacent a pipeline end 126 of pipe 124. The heat-shrinkable sleeves 100, 110 are pre-formed prior to installation on the pipes 122, 124 so as to conform substantially to the joint between pipes 122 and 124 and to a portion of pipe 124 adjacent pipe end 126, respectively. In an aspect, the sleeves 100, 110 may be the same, in that they are of substantially the same dimensions to conform substantially to the joint between pipes 122 and 124 and a portion adjacent pipe end 126 that are substantially the same dimensions. It will be understood, however, that sleeves of varying sizes and shapes may be manufactured for pipeline elements such as pipe joints, bends, or ends of differing types and sizes, on the same or on different pipelines. The sleeves could be manufactured so as to substantially conform to the predetermined type of pipe juncture, pipe contact point, pipeline elbow, or any other pipeline element of specific dimensions, when heated.

In the aspect shown, each of sleeves 100 and 110 comprise a heat-shrinkable base 101 adapted to conform substantially around the profile of at least one pipeline element when heat is applied. In this aspect, the pipeline elements are a pipe joint comprising the junction between pipe flanges of pipes 122 and 124, and a portion of the pipeline adjacent pipe end 126 of pipe 124. Sleeve 100 can be used to wrap around the junction of the pipe flanges of pipes 122 and 124. The sleeve 100 can then be heated to shrink around the flanges, substantially sealing the space or junction between the flanges. It will be understood that sleeve 100 may also overlap portions of the pipes 122 and 124 adjacent the flanges. Sleeve 110 can be used to wrap around a portion adjacent the end 126 of pipe 124, and can then be heated to shrink around that portion of pipe 124. In the aspect shown, the portion adjacent pipe end 126 is provided with a flange. The flange on pipe 124 can be mated with another element to close off end 126. Sleeve 110 can be used to substantially seal the space or junction between the flange adjacent pipe end 126 and the other element which provides closure to pipe end 126. It will be understood that in some aspects, a single sleeve may be used to wrap more than one pipeline element, for example, in the case of a tee-shaped joint having three separate pipeline elements sealed by a single sleeve.

The base 101 may be made out of any type of shrink materials that possess the property of being able to recover in length or shrink to smaller dimensions when heated. In an aspect, the sleeve could be made out of cross-linkable materials such as an extruded polyolefin sheet. For example, the material could be polyethylene or polypropylene. In a further aspect, the base 101 could be made out of an industrial-grade shrink wrap. It can be constructed so that it may be placed about a pipeline element and heated, causing it to shrink to conform substantially to the profile of the pipeline element. In an aspect, the base 101 can be resistant to corrosion to provide a protective coating to the pipeline element.

The sleeves 100 and 110 can be provided in a closed jacket form in which the sleeves 100 or 110 form a closed tube. For example, sleeve 110 can be provided in this form, whereby the sleeve 110 can be slid over the end 126 for installation on a portion adjacent the end 126. Alternatively, the sleeves 100 and 110 can be provided in an open-jacket form with at least one cleavage line in the base 101 through which at least one of the at least one pipeline element can be received for easy installation on the pipeline. For example, sleeve 100 can be provided in this form whereby it may be difficult to slide the base over the end 126 all the way to the flange junction. In an open jacket form, the flanges 122, 124 can be received through the cleavage line before being wrapped around the flange junction.

The sleeves 100, 110 each have at least one sensing aperture 130 adapted to conform substantially around at least a portion of the leak detection device 132 when the sleeves 100, 110 are heat-shrunk. In the aspect shown, the at least one sensing aperture 130 is disposed on the top section of the sleeves 100, 110, though in other aspects, the at least one sensing aperture may be disposed on a bottom or side portion of the sleeve.

The sleeves 100, 110 may also each have at least one inlet aperture or port, allowing the space between the sleeves 100, 110 and the outer sleeve environment to be in fluid communication with one another. This inlet port or aperture may be sealed off from the outer environment when the sleeves 100, 110 are in use.

Figure 2:
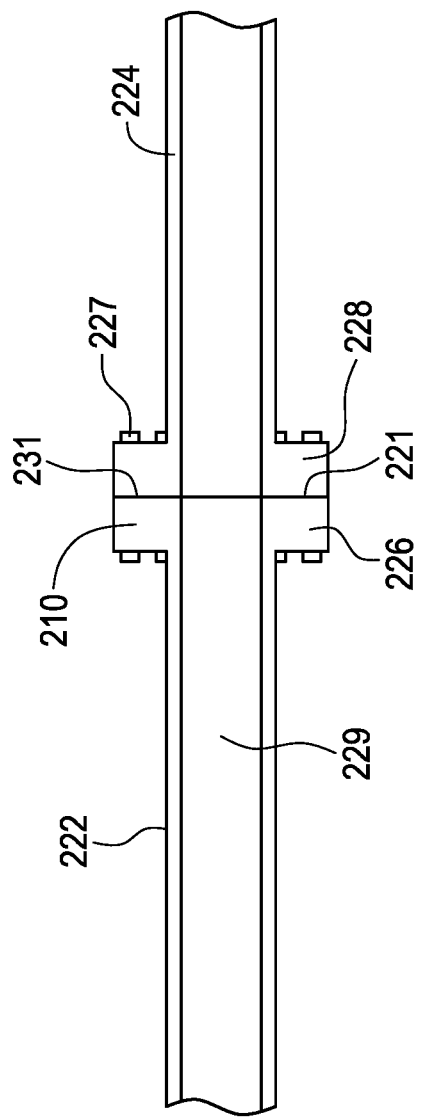
FIG. 2 is a side cross-sectional view of a pipeline joint.
Figure 3:
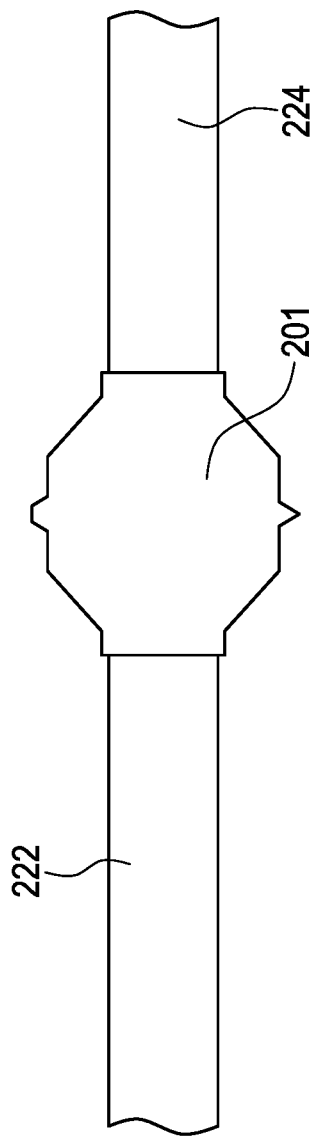
FIG. 3 is a side view of a heat-shrinkable sleeve in an aspect installed over the pipeline joint shown in FIG. 2.

FIG. 2 is a cross-sectional view of a pipeline element, which in the figure shown, is a pipe joint 210. FIG. 3 is a side view of a heat-shrinkable sleeve 201 installed over the pipeline element 210 of FIG. 2. The pre-formed sleeve 201 can be specific to a set of flanges. For example, the pre-formed sleeve 201 can be fabricated to fit over flanges of standard dimensions and configurations. In an aspect, the sleeve 201 is fabricated so as to be able to withstand 100% of the maximum allowable operating pressure while the pipeline system to which it is applied is in service. Prior to the pipeline system failure, a pressure sensing device will be triggered. The sleeve 201 so fabricated will thus allow the sleeve 201 to be fully operational prior to the pipeline system failure.

Figure 4:
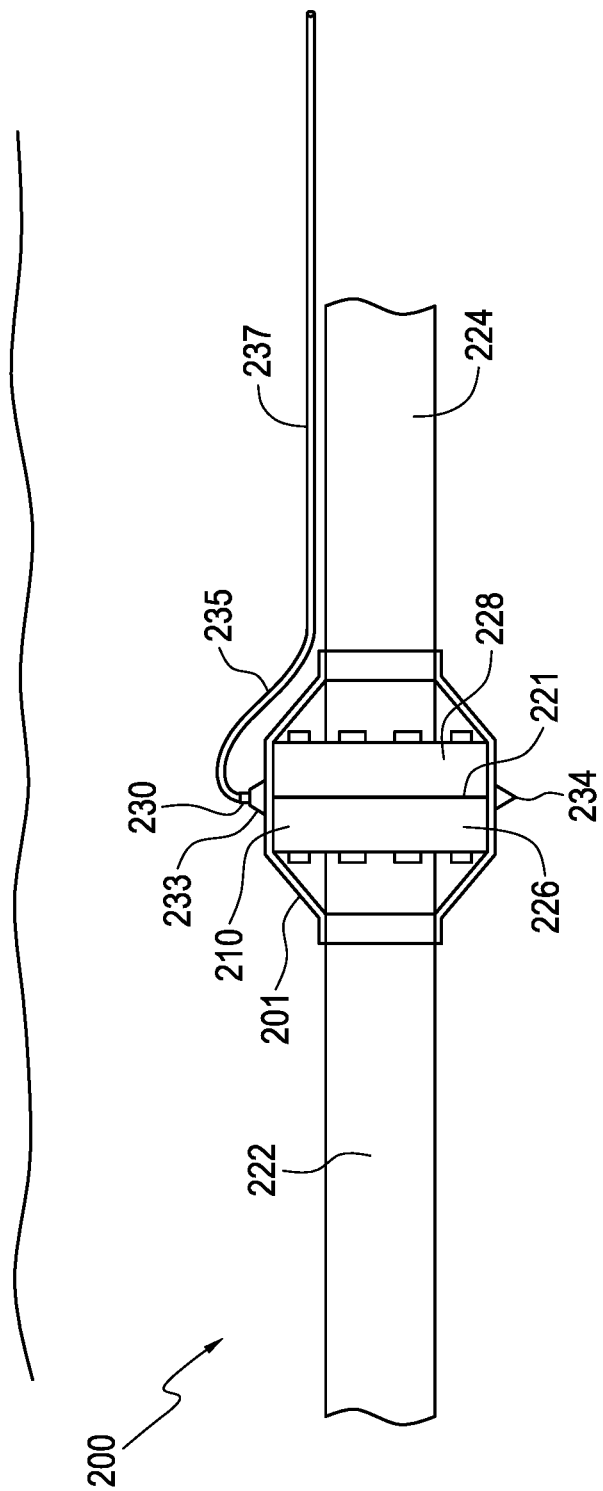
FIG. 4 is a side schematic view of a system for detecting leaks in an aspect.
Figure 5:
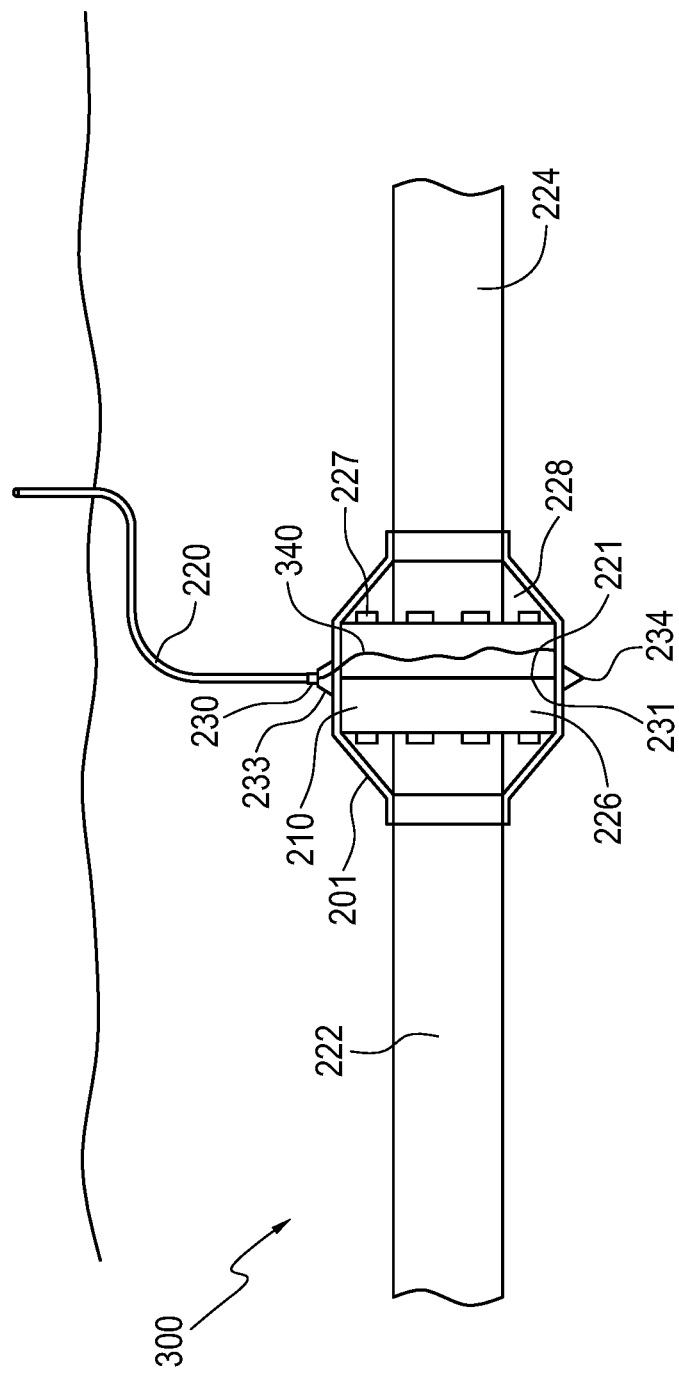
FIG. 5 is a side schematic view of a system for detecting leaks in a further aspect.

FIGS. 4 and 5 are schematic illustrations of systems 200, 300 for detecting leaks in pipeline elements, in aspects of the invention. The systems 200, 300 can have a pipeline element, which, in the figures shown, is the pipe joint 210 shown in FIG. 2. In other aspects, the pipeline element may be a pipe bend or a pipe end. A leak detection device may also be provided. A pre-formed, heat-shrinkable sleeve 201 conforms substantially around the profile of the pipe joint 210 and in FIG. 5, also conforms around at least a portion of the leak detection device 220. The sleeve 201 can comprise at least one inlet port or aperture 234 that allows the flow of injectable fluid therethrough, and which may be sealed off at times.

This sleeve 201 may be used for various types of pipelines and pipe elements, such as in the construction sector for either above- or below-grade hydrocarbon pipelines. In the aspect shown, the leak detection system 200, 300 is used on large-scale industrial pipelines having contact flanges 226, 228 that are bolted together with bolts 227. The pipe assembly or element can be of any configuration and in the case of the pipe joint shown in FIGS. 2, 4 and 5, the junction 221 between the flanges 226, 228 is formed by holding the flanges 226, 228 together through the use of bolts 227 to bolt flanges 226, 228 of the pipes 222, 224 together such that a continuous channel 229 is formed between pipes 222 and 224. Any known means or the use of any type of pipe coupling members could, however, be used to form a pipe joint and it will be understood that any method of coupling the ends of pipes together may be used singly or in combination in the systems 200, 300, such as the use of welding, industrial strength adhesive, screw-in type pipe joints, or the like. In some aspects, a gasket 231 may be inserted at the contact point between the flanges 226 and 228 to provide for additional reinforcement against leaks. In some aspects, there may be three or more pipes which are connected at a junction and which may employ the use of a heat-shrinkable sleeve, such as a Tee-shaped junction of three pipe ends or a cross-shaped junction of four pipe ends. Regardless of the type of pipeline element, a heat-shrinkable sleeve used in the leak detection system can enclose it, and in the presently-described aspect, the sleeve 201 can enclose the junction 221 between the pipes 222, 224, capable of substantially encircling or covering the flanges 226, 228 at the junction 221 between the pipes 222, 224. The shrink sleeve 201 is pre-formed such that when heat is applied to the pre-formed sleeve 201, it will shrink and fit over and around the set of flanges 226, 228. In some aspects, the heated sleeve 201 shrinks snugly around the flanges 226, 228 and to form a seal over the flanges 226, 228. In some aspects, the sleeve 201 may prevent spillage of liquid from the junction 221 between pipes 222, 224 in the event of a leakage at or between the flanges 226, 228, by providing reinforcement at the junction 221 and acting as an extra seal at the junction 221.

At least one sensing aperture 230 is disposed on the sleeve 201 to allow for connection of a leak detector mechanism that can detect a leak between the junction 221 between the pipes 222, 224 and the sleeve 201. The at least one sensing aperture 230 can comprise a port 233, as shown in FIGS. 4 and 5, which allows for connection of tubing or the like thereto. In other aspects however, the at least one sensing aperture 230 may comprise a simple aperture that can conform substantially around at least a portion of a leak detector mechanism running from the space between the junction 221 between the pipes 222, 224 and the sleeve 201.

The leak detector mechanism could use varying pressure to detect a leak in an aspect, or could use an electrical contact. In the aspect shown in FIG. 4, the leak detector mechanism comprises at least one sensing aperture 230 having a port 233 extending radially outward from the sleeve 201, and which can allow for the attachment of tubing 235 thereto and which can lead to a pressure detector. In the aspect shown in FIG. 5, a leak detection device 220 can be provided that can sense a leak in the pipeline element 210. The aperture 230 can conform substantially around at least a portion of the leak detection device 220 when the sleeve 201 is heat-shrunk.

An injection or inlet port or aperture 234 is also provided on the sleeve 201 that can allow a flowable sealant or the like to flow therethrough, which may be used to seal the spaces between the flanges 226, 228 and the sleeve 201. The inlet port 234 can allow for an injectable product to fill voids beneath the sleeve 201, in case the shrunken sleeve 201 does not form a good seal or if any such seal is insufficient. For example, a sealing agent or caulk can be injected through the injection port 234 to the inside of the sleeve 201 so as to provide additional sealing capabilities to gaps or abnormalities such as grooves which disrupt the seal.

To use the systems 200, 300, the heat-shrinkable sleeve 201 is wrapped around the junction 221 between pipes 222, 224. The sleeve 201 is then heated so as to shrink around the junction 221 between the pipes 222, 224.

The system for leak detection 200 shown in FIG. 4 comprises the shrink sleeve 201 and tubing 235 that connects to the port 233 in the sleeve 201. The tubing 235 can be in fluid communication with the space between the sleeve 201 and the flanges 226, 228. In this way, the sensing aperture 230 can vent the interior of the sleeve 201 to the tubing 235, allowing a detection device operatively connected to the tubing 235 to detect changes in the interior of the sleeve 201 that would indicate a leak.

The detection device can be any sort of device that can detect the flow of fluid through any means such as by detecting pressure changes in the sleeve 201 or by detecting the fluid itself, including a pressure switch or pressure transmitter. For example, upon leakage of a fluid through the joint between a set of flanged pipes 222, 224, a positive pressure can be created which transfers to the tubing 235, which change in pressure can be detected by a pressure-sensitive monitoring system, thus indicating the existence of a leak. In other aspects, the tubing 235 can channel product leaking from the set of flanges 226, 228 to the location of a monitoring device, which may be any type of device that can detect the presence of certain fluids present in the pipeline. As an example, the monitoring device could be a device that detects the fluid itself, such as a hydrocarbon or liquid sensing tape, or the like.

The tubing 235 can extend from beneath the sleeve 201 and through the sensing aperture 230, being in fluid communication with the space between the sleeve 201 and the flanges 226, 228 and the location of the detection device or monitor. The flanges 226, 228 could be situated either above or below grade, and in the aspect shown in FIG. 4, the flanges 226, 228 are below grade. If the flanges 226, 228 are situated below grade, the tubing 235 could extend upward toward a detection device that is above grade, or could extend at a below grade level to a detection device that is also below grade. In the aspect shown in FIG. 4, the tubing 235 extends below grade. The below grade tubing 235 could be provided with a protective coating 237 so as to prevent corrosion or that can act as reinforcement against leaks or breaks in the tubing 235 which could lead to detection failure.

In the aspect shown in FIG. 5, the leak detection system 300 comprises a shrink sleeve 201 and a product sensing device 340 that can indicate a leak. While the product sensing device 340 could be any type of device that detects a leak, in the aspect shown, the device 340 is an electrical sensor fitted between the sleeve 201 and the flanges 226, 228 that can trigger an alarm in the event of a leak. The electrical contact 340 can be positioned so as to detect moisture between the pipes 222, 224 and/or flanges 226, 228 and the sleeve 201, which can indicate a leak between the sleeve 201 and the flanges 226, 228.

In an aspect, the product sensing device 340 is a Pentair Thermal Management™ product, such as a TraceTek TT5000-HS™ sensing cable that senses the presence of liquid hydrocarbon fuels, but does not react to the presence of water. The sensing cable 340 may detect the presence of a specific fluid at any point along its length. The cable 340 could, in an aspect, have only one end beneath the sleeve 340, or could in other aspects extend deeper between the sleeve 340 and the flanges 226, 228, in some aspects being wrapped around the flanges 226, 228. In an aspect, the cable 340 is wrapped around the junction 221 between the flanges 226, 228 at least once. The cable 340 could exit the sleeve 201 through the sensing aperture 230. The sensing aperture 230 can act as an inlet into the interior of the sleeve 201, allowing the electrical contact cable 340 to run therethrough. In some aspects, a protective cap or sheath may be provided over the portion of the cable 340 running outside of the sleeve 201, or a tube may be provided in fluid communication with the port 233 that allows the cable 340 to run therethrough, while protecting the cable 340 from outside elements and in this way, preventing damage to the cable 340 or false positive results of a leak. With the flanges 226, 228 situated below grade, the cable 340 could extend generally upward toward a programmable logic controller that is above grade; however, in some aspects the sensing device will extend at a below grade level to a monitoring device that is also below grade.

The sensing device 340 could be connected to a programmable logic controller. In an aspect, a cable runs from the sensing device 340 to a monitoring system that identifies the leak. An alarm can also be provided that notifies personnel of the leak. A locating module can also be provided, which pinpoints the location of the leak on the pipeline system.

The sensing device or cable 340 could be incorporated into the pre-formed shrink sleeve 201. When heat is applied to the pre-formed sleeve 201, the sleeve 201 can shrink down to seal the set of flanges 226, 228, while encapsulating the sensing device 340 beneath the sleeve 201 to allow the sensing device 340 to detect any product escaping out of the pipeline system through the flanges 226, 228. The cable 340 can be interposed between the pipes 222, 224 and the sleeve 201 and can be electrically connected to a leak detector, whereby leaked fluid will trigger an alarm signal, alerting personnel to the need for repairing or replacing the flanges 226, 228.

Figure 6:
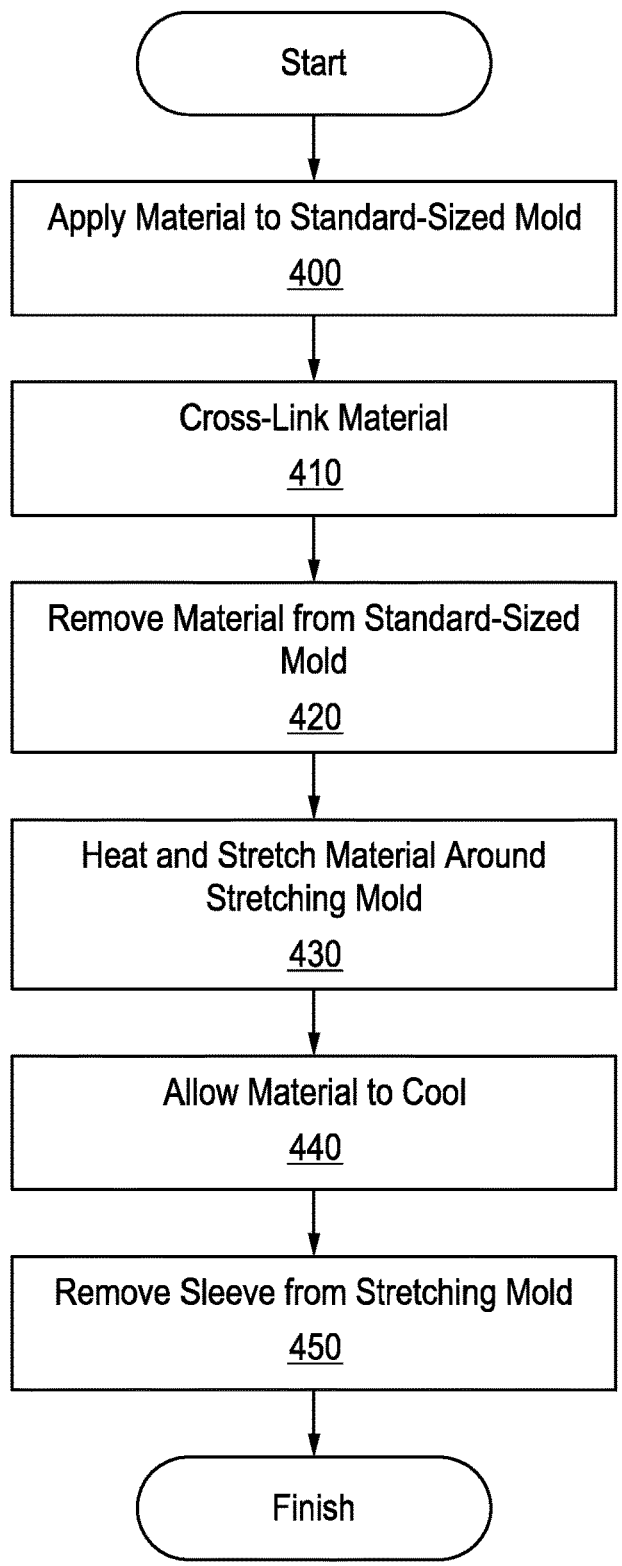
FIG. 6 is a flow chart illustrating a method of manufacturing a heat-shrinkable sleeve in an aspect.

FIG. 6 illustrates a flow chart in a method of manufacturing a heat-shrinkable sleeve in an aspect. FIGS. 7A to 7C illustrate a standard-sized sleeve mold 500, a stretching sleeve mold 510, and a heat-shrinkable sleeve 520 formed using the sleeve molds 500, 510 shown in FIGS. 7A and 7B, in a method of manufacturing a heat-shrinkable sleeve 520.

Referring to FIGS. 6 and 7A to 7C, in a method of manufacturing a pre-formed shrinkable sleeve 520, at step 400 a material is extruded or otherwise applied around a standard-sized sleeve mold 500, which in an aspect, is of substantially the same shape, proportions and dimensions as the pipeline element to which the sleeve 520 is to be ultimately applied. In an aspect, the standard-sized sleeve mold could be the same pipeline element to which the sleeve 520 is to be ultimately applied, or may be the same type or model of pipeline element on which the sleeve 520 is to be ultimately used. The material applied around the standard-sized sleeve mold 500 may conform around the standard-sized sleeve mold 500 in that it may be only slightly larger than the standard-sized sleeve mold 500, with a majority of the inner surface of the material being in contact with the standard-sized sleeve mold 500. At step 410, the material can be cross-linked through an electron irradiation process by subjecting the material conformed around the standard-sized sleeve mold 500 to an electron irradiating beam. At step 420, the cross-linked material can be removed from the standard-sized sleeve mold 500 and at step 430 can be heated and stretched around a stretching sleeve mold 510.

In some aspects, the material can be cut off from the standard-sized sleeve mold 500 using scissors or the like at a cleavage line to create a split jacket through which the pipeline element may be received, and which may make removal of the material from the molds 500, 510 easier.

In other aspects of the invention, however, the sleeve 520 may be made with a closed cross-section through the use of, for example, inflatable and deflatable molds 500, 510 allowing for casting of the sleeve 520 when inflated, and easy removal of the sleeve 520 from the molds 500, 510 when the molds 500, 510 are deflated.

In an aspect, the stretching sleeve mold 510 is of substantially the same shape and proportions but of larger dimensions than the pipeline element to which the sleeve 520 is to be ultimately applied. To substantially conform to the profile of the pipeline element to which the sleeve 520 is to be ultimately applied, the stretching sleeve mold 510 can be sized such that the sleeve 520 that is stretched around the stretching sleeve mold 510 will be able to receive the pipeline element of specific dimensions therein, and so as to shrink to a size that is only slightly larger than the pipeline element or standard-sized sleeve mold 500, but with generally the same shape and proportions as the pipeline element when heat is applied. In this way, when the sleeve 520 is in its shrunken state, at least a portion of the inner surface of the sleeve 520 can be in contact with the pipeline element to which it is applied. At step 440, the cross-linked and stretched material can be allowed to cool. At step 450, the cooled material can be removed from the stretching sleeve mold 510, and since the material has been cross-linked, it will be pre-disposed to recover its original dimensions corresponding to the standard-sized sleeve mold 500 when re-heated.

In an alternative method of manufacturing a pre-formed shrinkable sleeve 520, a material is simultaneously heated and applied around the stretching sleeve mold 510, which could be of substantially the same shape and proportions but of larger dimensions than the pipeline element to which the sleeve 520 is to be ultimately applied. The sleeve 520 can be allowed to cool and sent to an electron irradiating beam for the cross-linking process. The resulting stretched, cross-linked sleeve 520 can be removed from the stretching sleeve mold 510 either before or after the cross-linking process.

The standard-sized sleeve mold 500 and stretching sleeve mold 510 could have a sensing protrusion 550, 551 and an injection port protrusion 560, 561 around which the material can be applied, whereby the resulting pre-formed sleeve 520 has apertures 555, 565 corresponding to the protrusions 550, 551 and 560, 561 on the molds 500, 510. Alternatively, the sleeve 520 can be formed without the use of protrusions on the sleeve molds, and sensing and/or injection port apertures can be formed therein afterward by cutting such apertures into the material.

Optionally, an adhesive can be applied to an inside wall of the pre-formed sleeve 520. This adhesive may aid in installation of the pre-formed sleeve 520 onto the pipeline element by holding the sleeve 520 in place during the heating process. The adhesive can be chosen based on operating conditions of the pipeline element to which the sleeve 520 is to be applied. As the adhesive may be subjected to high heat during the shrinking process, a hard, semi-crystalline hot-melt adhesive may be chosen.

When applying the sleeve 520 to a pipeline element, the apertures 555, 565 can be aligned so as to fit around tubing, sensing cables, or inlet ports. As the film is heated, the sleeve 520 can shrink up against the pipeline element to be wrapped. It will be understood that in some cases, the sleeve 520 will be wrapped around the junction between pipes, as well as at least a portion of the pipes, namely, the ends of the pipes meeting at the junction, in order to provide a seal between the sleeve 520 and the pipes that substantially seals off the pipe junction.

In an aspect, a sealing strip or closure may be applied to a cleavage line of the split jacket during sleeve installation to keep the sleeve in place during and after the heating process. In a further aspect, the edges of the cleavage line of the open split jacket sleeve may overlap one another during sleeve installation and may either form together automatically during the application of heat during the shrinking process, or manual pressure can be applied to the overlapped ends to form a bond between the overlapped ends. In some aspects, an adhesive may be applied to seal up the cleavage point. In other aspects, a laminar panel or patch can be used to bond the overlapped longitudinal edges.

As the pre-formed, pipeline element-specific sleeve 520 is stretched, it will want to recover in length when heated. The heat-shrinkable sleeve 520 can seal pipeline element leaks by shrinking when heated so that it conforms substantially to the profile of the pipeline element for which it was formed. The heat applied to the sleeve 520 can be through a variety of means, such as through a hot air gun, a propane torch, or hot water.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A system for detecting leaks in pipeline elements comprising:
   a pipe joint having: a first pipe ending with a first flange; and a second pipe ending with a second flange, wherein the first flange and the second flange are connected together to join the first pipe and the second pipe;
   a leak detection device; and
   a pre-formed, heat-shrinkable sleeve comprising at least one inlet aperture and having a varying cross-section conforming substantially around a profile of the first flange on the first pipe, the second flange on the second pipe and at least a portion of the leak detection device before heat is applied to the sleeve to shrink the sleeve.

2. The system of claim 1 wherein the leak detection device comprises at least one of a pressure detector, a moisture detector, and a hydrocarbon detector.

3. The system of claim 1 wherein the leak detection device comprises an electrical contact.

4. The system of claim 1 wherein the leak detection device comprises a sensing cable extending through a sensing aperture in the sleeve and between the sleeve and the pipeline element.

5. The system of claim 4 further comprising a protective sheath over at least a portion of the sensing cable.

6. The system of claim 1 wherein the leak detection device comprises:
   a port extending radially outward from the sleeve; tubing in fluid communication with the port; and at least one of a pressure detector, a moisture detector, and a hydrocarbon detector.

7. The system of claim 6 further comprising a protective coating around at least a portion of the tubing.

8. The system of claim 1 further comprising an alarm that is triggered when a leak is detected.

9. The system of claim 1 further comprising a leak locating module to identify the location of a leak in a pipeline system.

10. The system of claim 1 wherein a plurality of bolts pass through the first flange and the second flange to connect the first flange to the second flange.

* * * * *